Feb. 2, 1943. J. W. EKSTEDT ET AL 2,309,942
METHOD OF AND BLANK FOR PRODUCING EYELETS OR THE LIKE
Original Filed Feb. 6, 1940 9 Sheets-Sheet 1
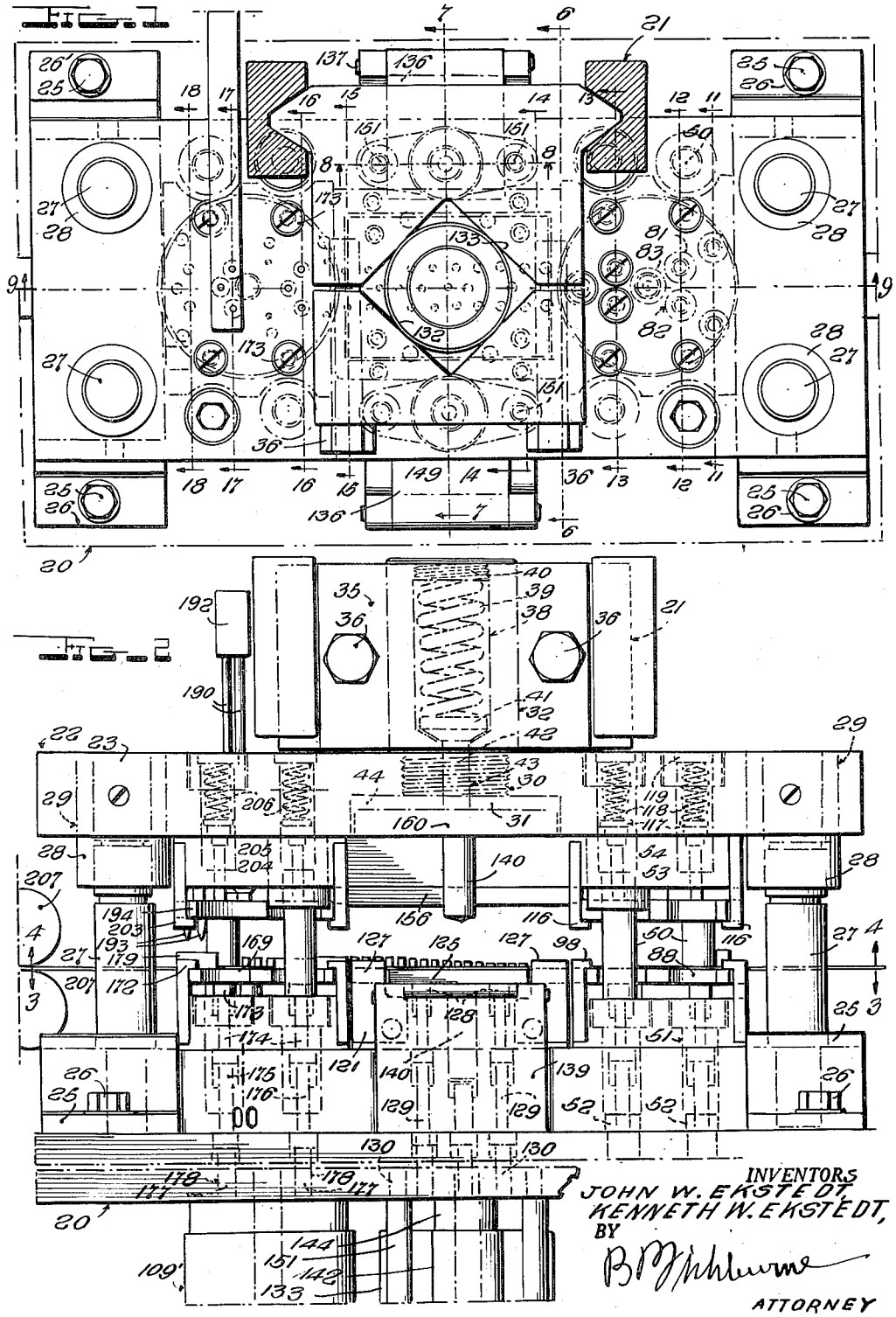
INVENTORS
JOHN W. EKSTEDT
KENNETH W. EKSTEDT,
BY
ATTORNEY Feb. 2, 1943.   J. W. EKSTEDT ET AL   2,309,942
METHOD OF AND BLANK FOR PRODUCING EYELETS OR THE LIKE
Original Filed Feb. 6, 1940    9 Sheets-Sheet 2
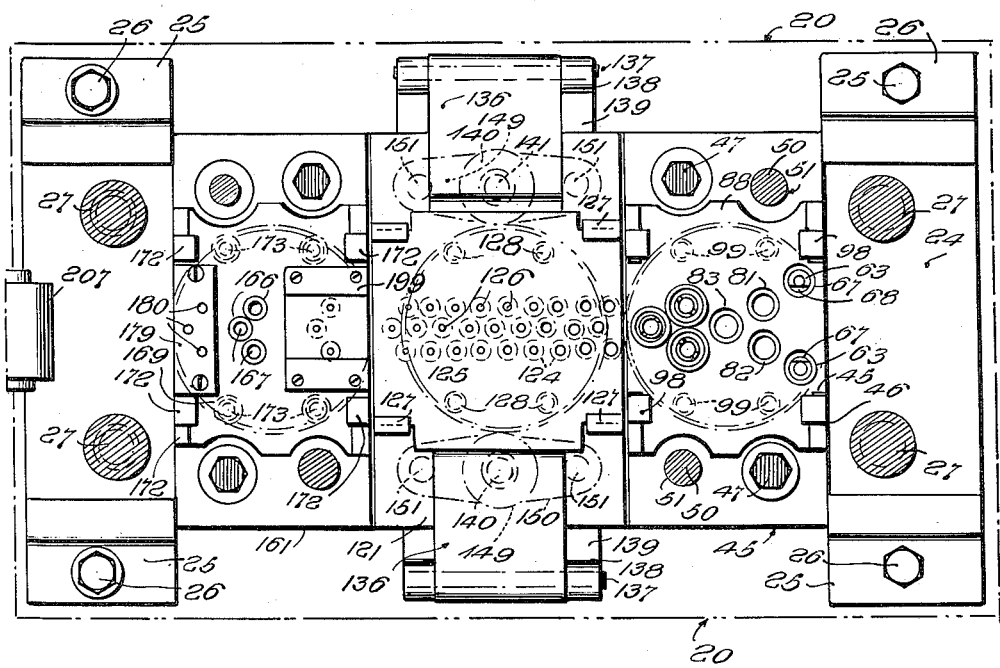
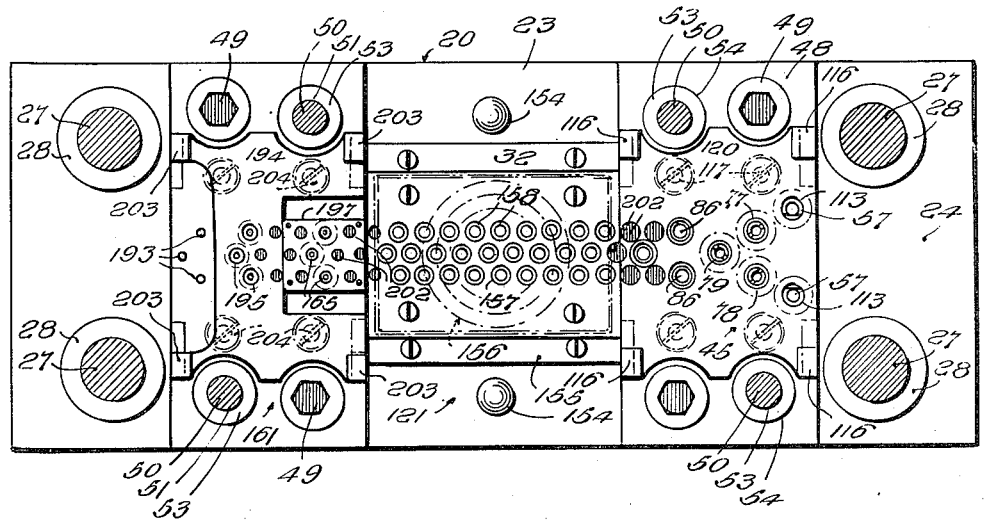
INVENTORS
JOHN W. EKSTEDT
KENNETH W. EKSTEDT,
BY
ATTORNEY

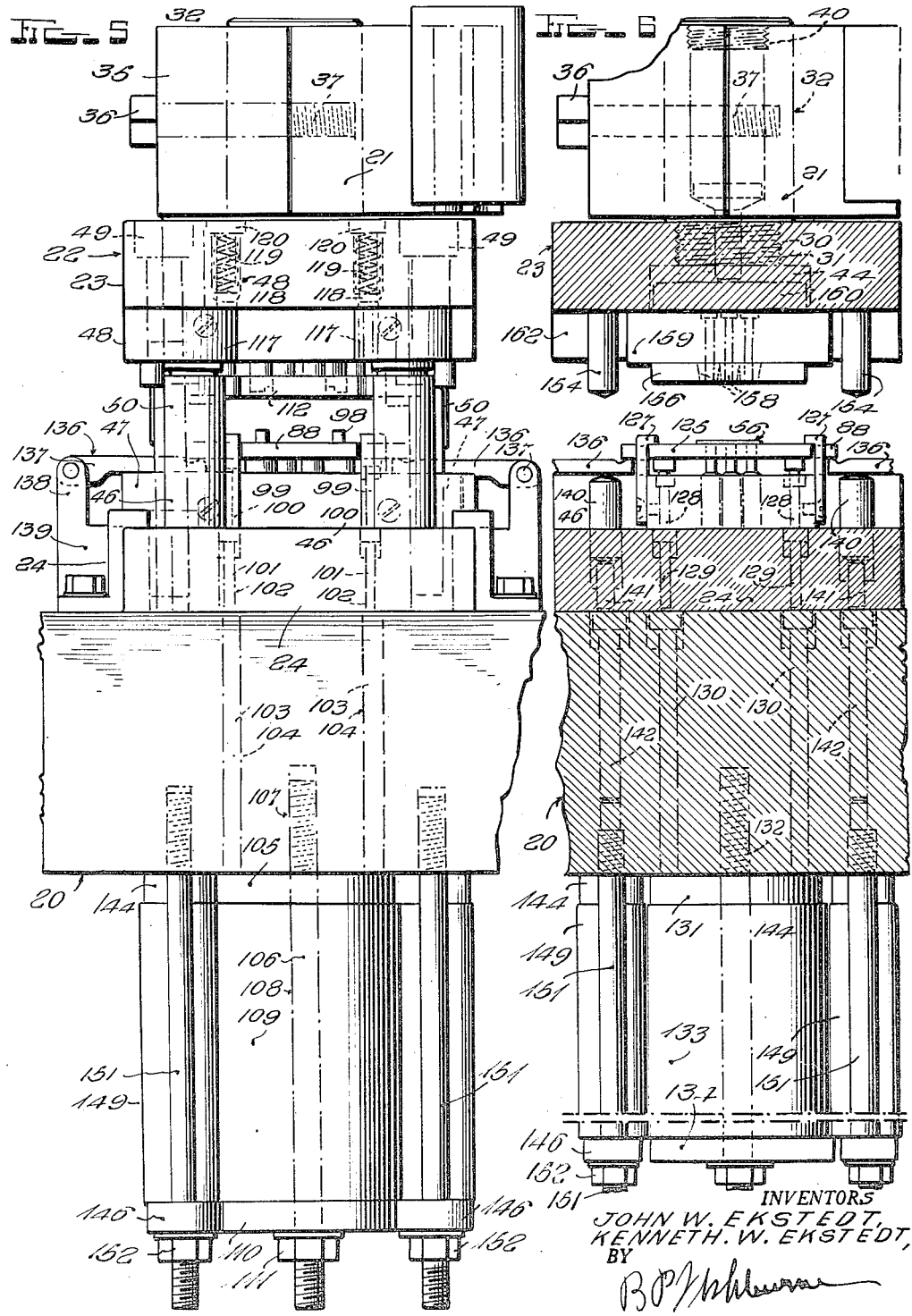

Feb. 2, 1943.  J. W. EKSTEDT ET AL  2,309,942
METHOD OF AND BLANK FOR PRODUCING EYELETS OR THE LIKE
Original Filed Feb. 6, 1940  9 Sheets-Sheet 4
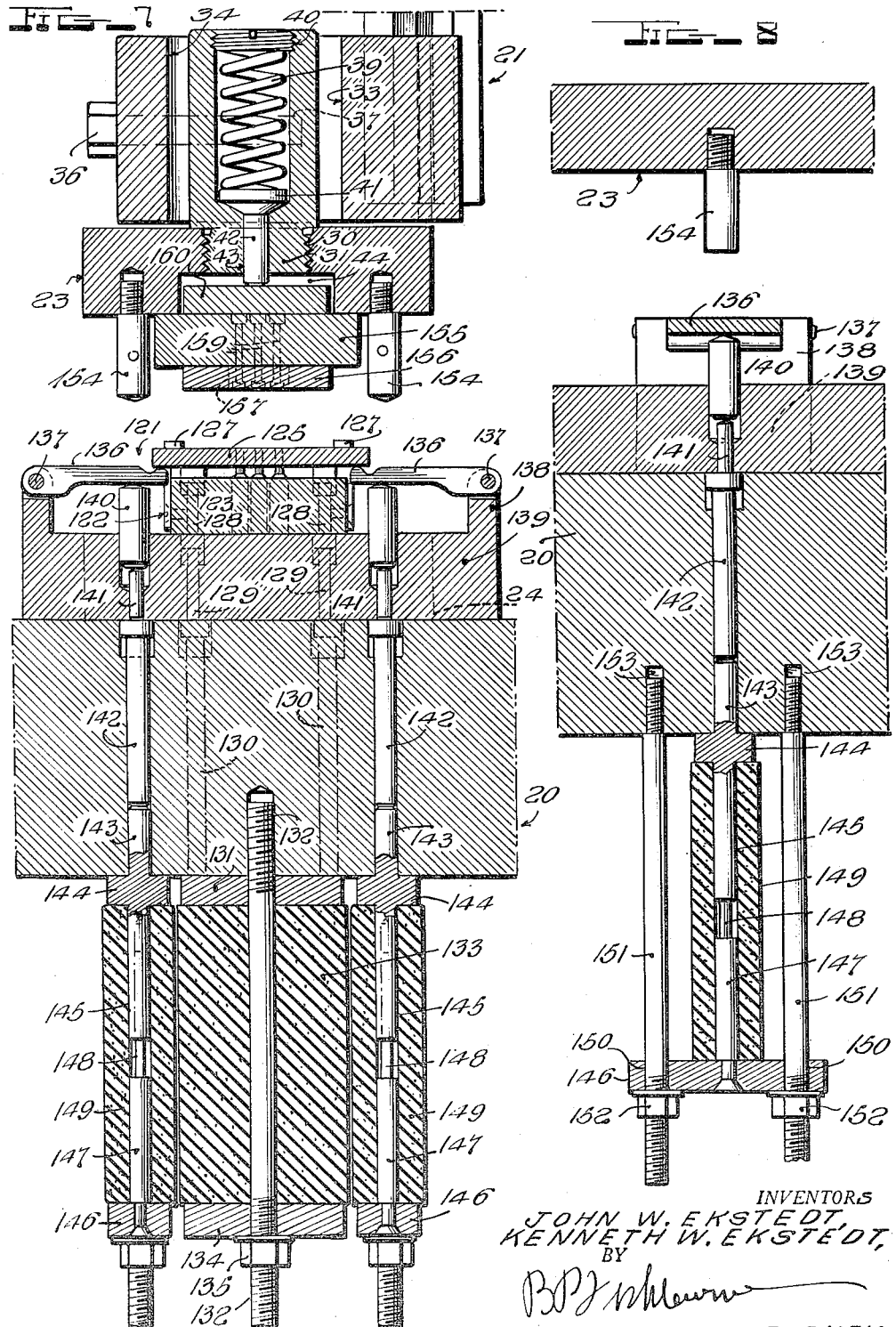
INVENTORS
JOHN W. EKSTEDT,
KENNETH W. EKSTEDT,
BY
ATTORNEY

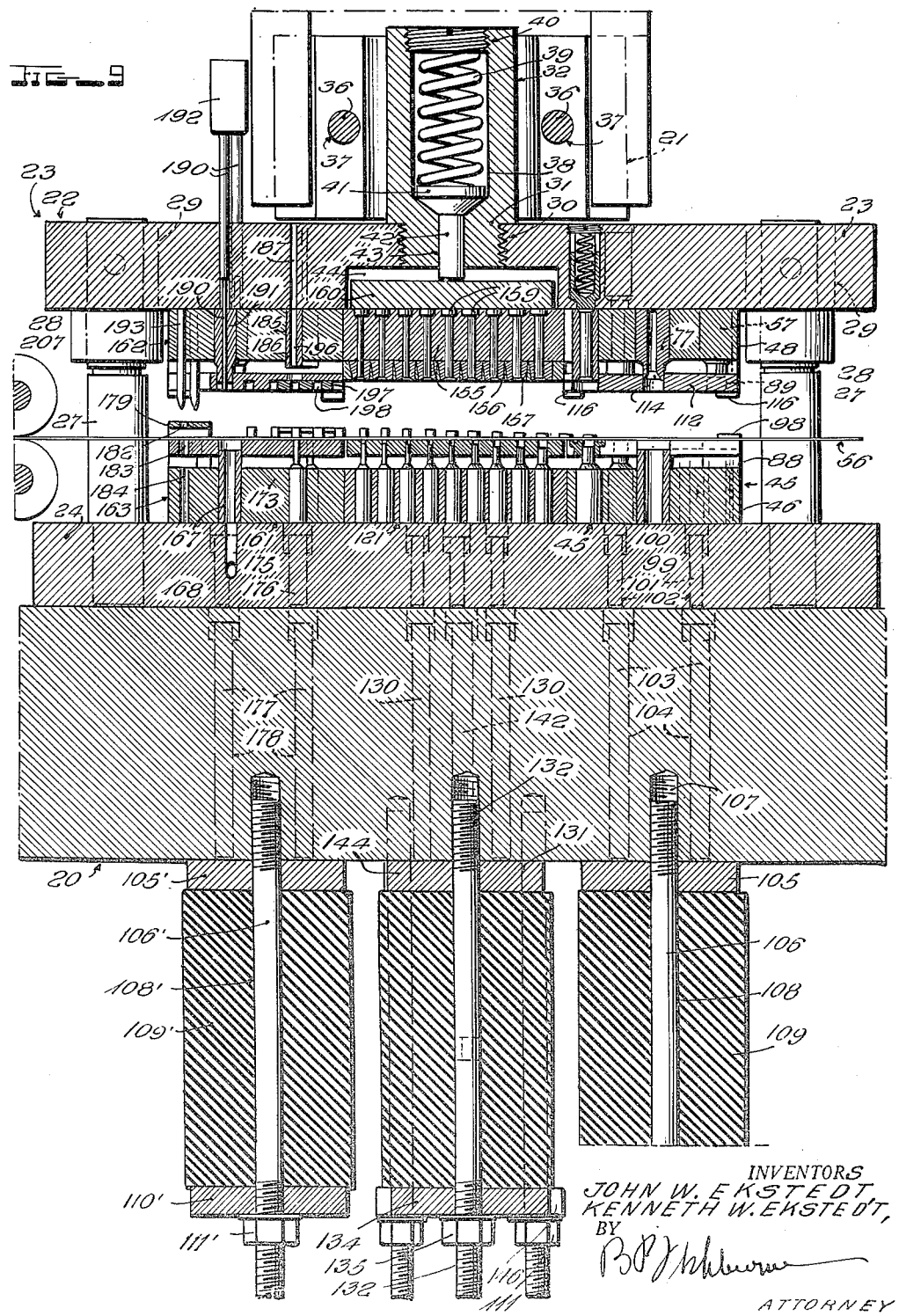

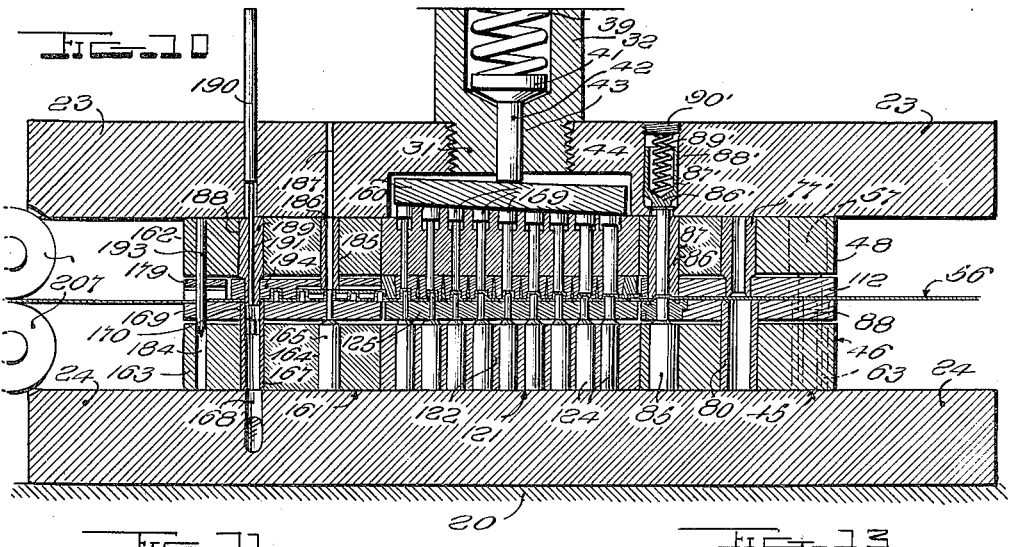
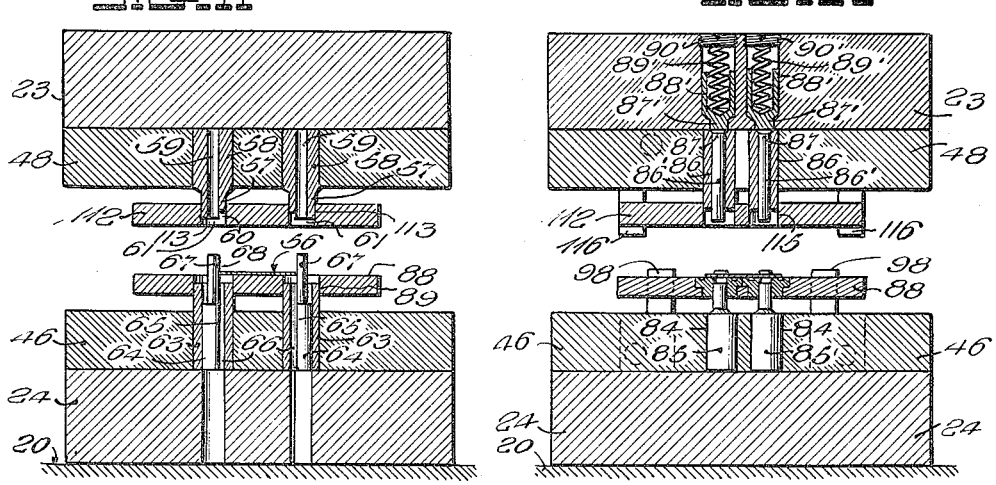
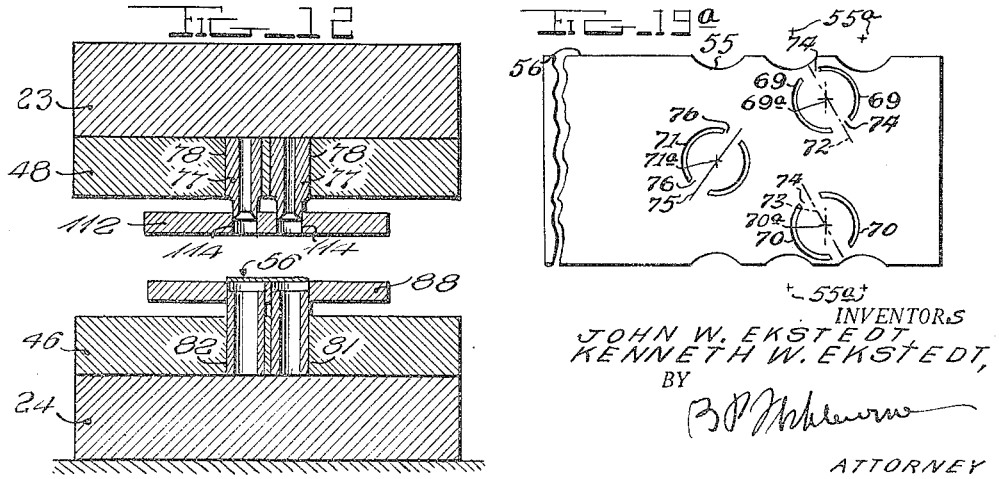

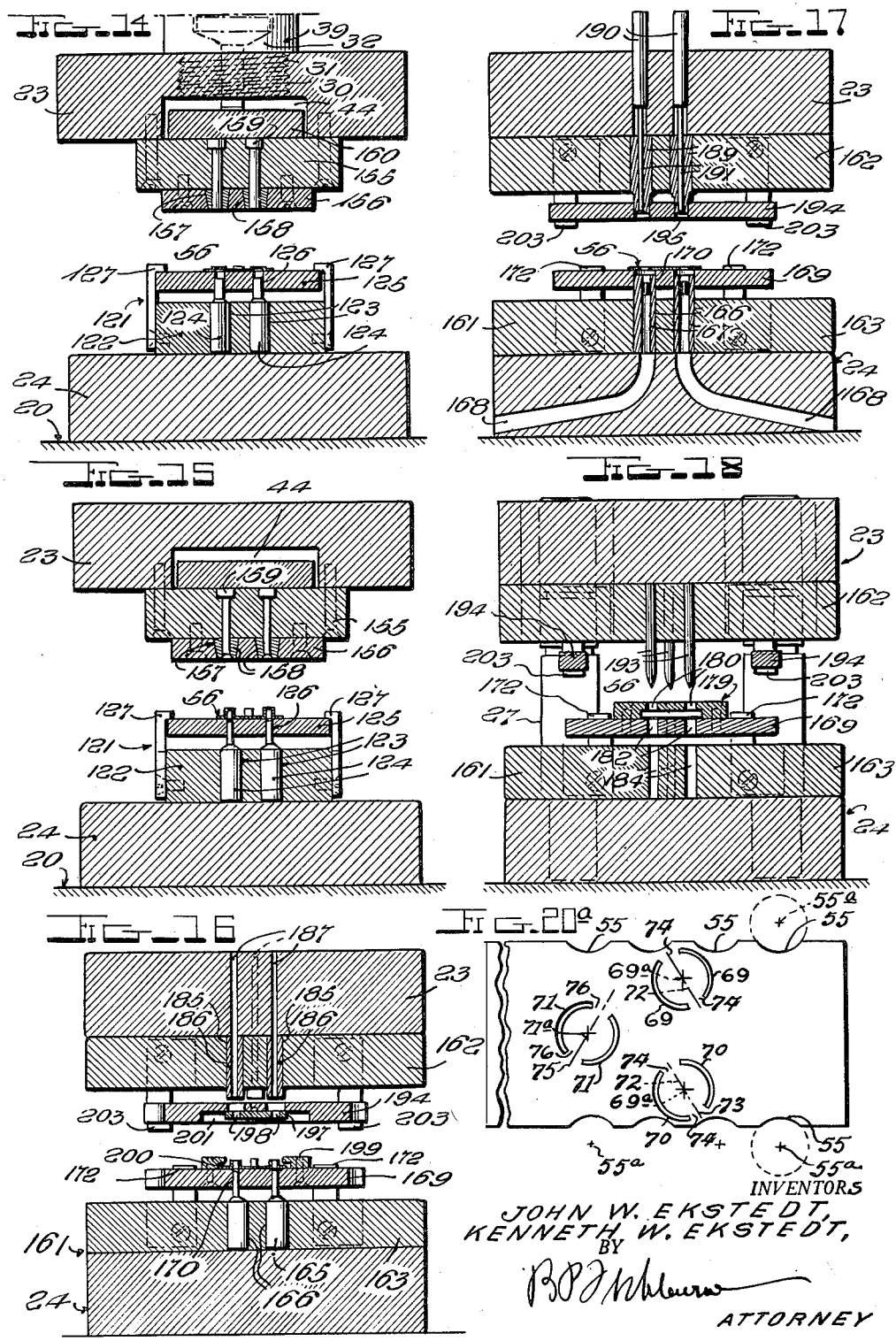

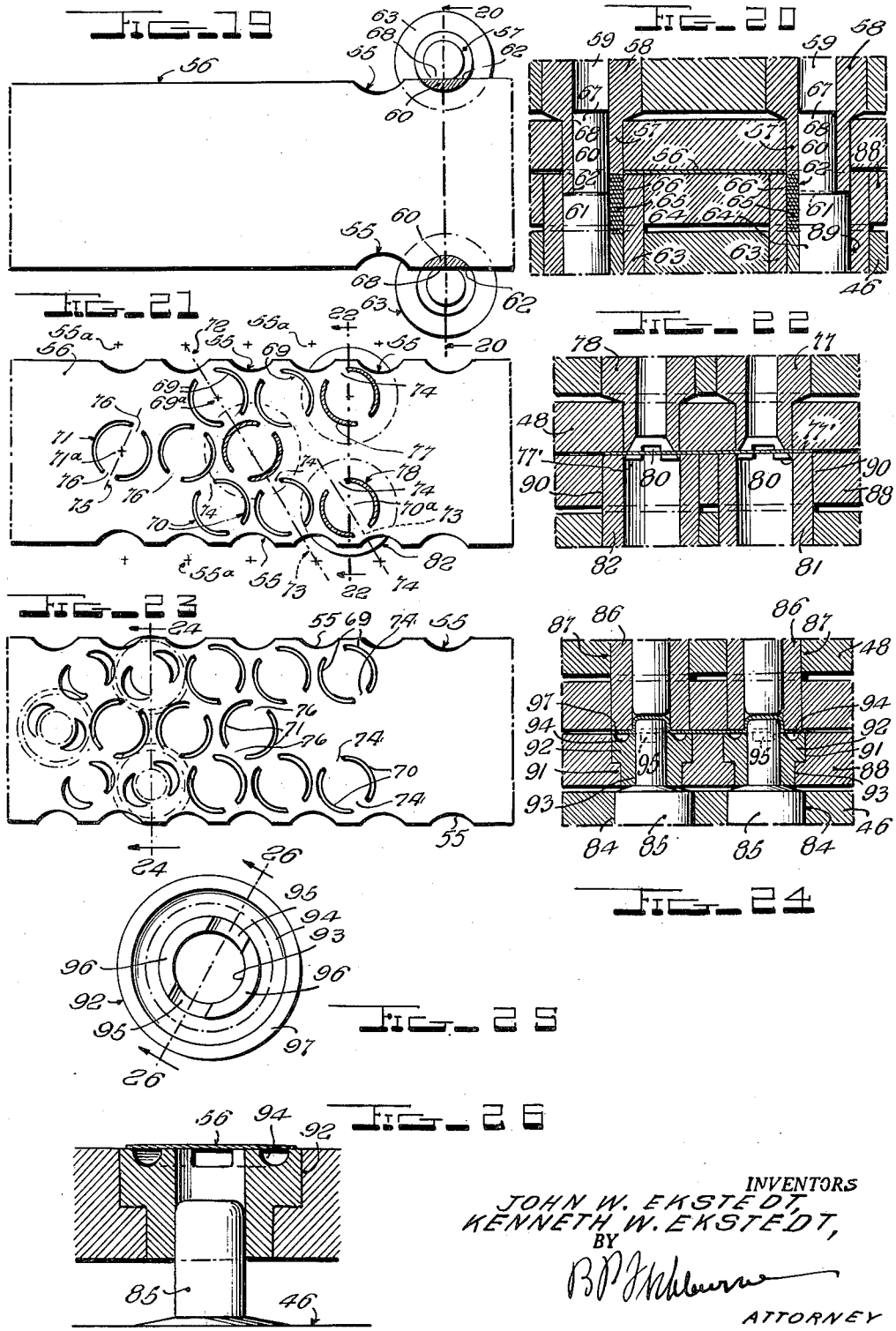

Feb. 2, 1943.  J. W. EKSTEDT ET AL  2,309,942
METHOD OF AND BLANK FOR PRODUCING EYELETS OR THE LIKE
Original Filed Feb. 6, 1940  9 Sheets-Sheet 9
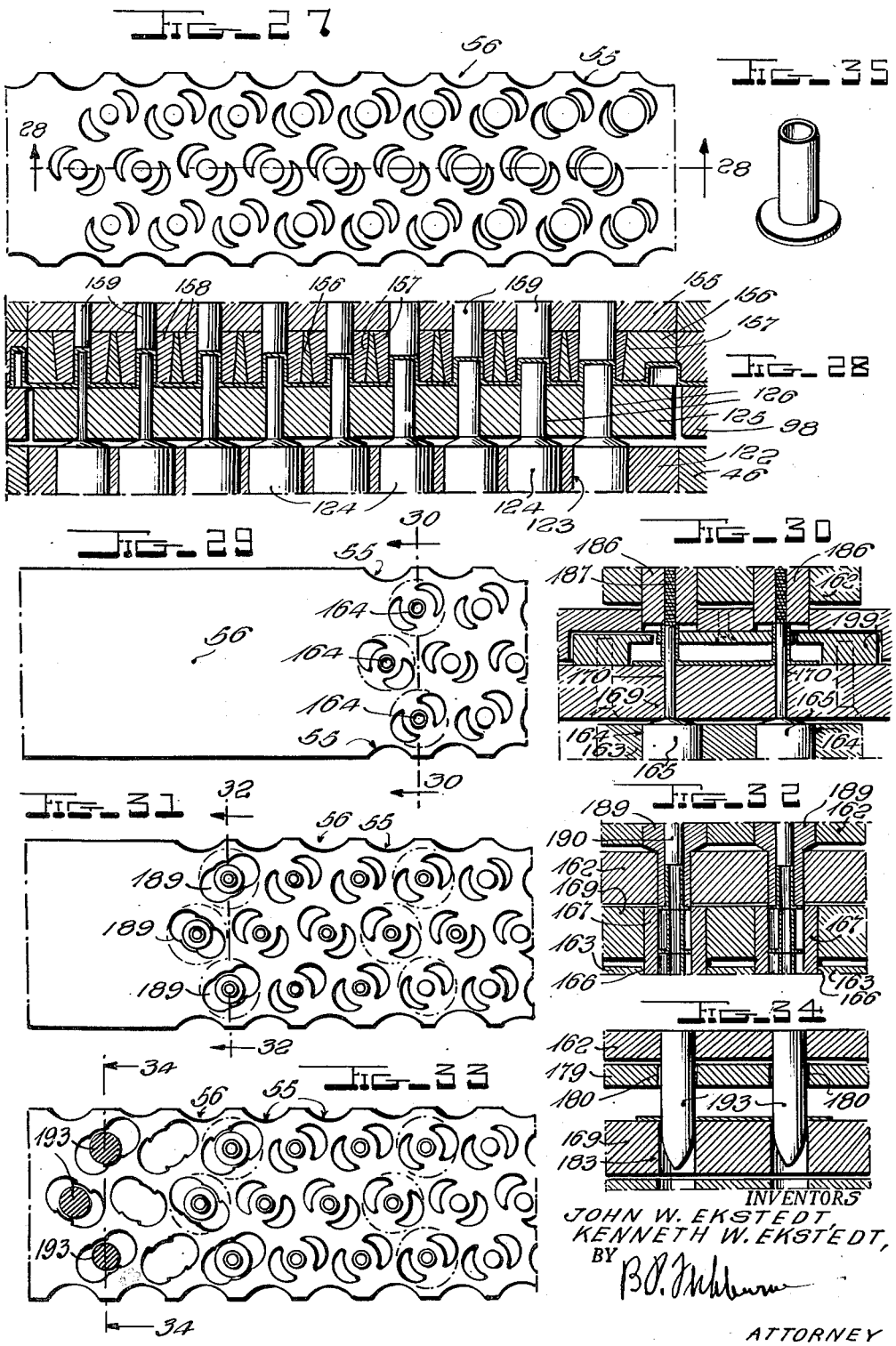

Patented Feb. 2, 1943

2,309,942

UNITED STATES PATENT OFFICE 2,309,942

METHOD OF AND BLANK FOR PRODUCING EYELETS OR THE LIKE

John W. Ekstedt and Kenneth W. Ekstedt, Union, N. J., assignors to General Eyelet Supply Company, Inc., Roselle Park, N. J., a corporation of New Jersey Original application February 6, 1940, Serial No. 317,604. Divided and this application September 17, 1941, Serial No. 411,242

18 Claims. (Cl. 113—50)

Our invention relates to a method of and blank for producing eyelets or the like.

An important object of the invention is to provide a method of the above-mentioned character whereby eyelets may be formed from a blank or strip of metal, by deep drawing, and separated from the blank or strip subsequent to their completion.

A further object of the invention is to provide a method of the above-mentioned character whereby the eyelets may be formed by deep drawing, without tearing or disrupting the material of the completed eyelet.

A further object of the invention is to provide a method of the above-mentioned character whereby a plurality of eyelets are completed upon each cycle of operation of the method.

A further object of the invention is to provide a method of the above-mentioned character which will produce a plurality of groups of partly completed eyelets, and subject each group in succession to a drawing operation for completing the eyelets in such group.

Other objects and advantages of the invention will be apparent during the course of the following description.

The present application is a division of our application for Apparatus for producing eyelets, Serial No. 317,604, filed February 6, 1940, which has matured into Patent No. 2,260,891 under date of October 28, 1941.

In the accompanying drawings forming a part of this application and in which like numerals are employed to designate like parts throughout the same, Figure 1 is a plan view of the apparatus, Figure 2 is a side elevation of the same, parts broken away, Figure 3 is a horizontal section taken on line 3—3 of Figure 2, looking down in the direction of the arrow, Figure 4 is a similar view taken on line 4—4 of Figure 2, looking upwardly in the direction of the arrow, Figure 5 is a rear end elevation of the apparatus, Figure 6 is a vertical transverse section taken on line 6—6 of Figure 1, Figure 7 is a similar view taken on line 7—7 of Figure 1, Figure 8 is a longitudinal vertical section taken on line 8—8 of Figure 1, Figure 9 is a longitudinal vertical section taken on line 9—9 of Figure 1, Figure 10 is a view similar to Figure 9, showing the parts in the closed position, Figure 11 is a transverse section taken on line 11—11 of Figure 1, Figure 12 is a similar view taken on line 12—12 of Figure 1, Figure 13 is a similar view taken on line 13—13 of Figure 1, Figure 14 is a similar view taken on line 14—14 of Figure 1, Figure 15 is a similar view taken on line 15—15 of Figure 1, Figure 16 is a similar view taken on line 16—16 of Figure 1, Figure 17 is a similar view taken on line 17—17 of Figure 1, Figure 18 is a similar view taken on line 18—18 of Figure 1, Figure 19 is an enlarged view of the metal ribbon, showing the notching of the edges of the same, Figure 19a is a plan view of the blank or ribbon showing the next step following those shown in Figure 19, Figure 20a is a similar view showing the next step following Figure 19a, the succeeding triangular group of slits being omitted for the purpose of illustration, Figure 20 is a transverse vertical section taken on line 20—20 of Figure 19, Figure 21 is an enlarged plan view of the metal ribbon, showing the same fed forward for the next step and slit, Figure 22 is a transverse section taken on line 22—22 of Figure 21, Figure 23 is a plan view of the strip, showing the same fed forward to the next step and illustrating the first drawing operation, Figure 24 is a transverse vertical section taken on line 24—24 of Figure 23, Figure 25 is an enlarged plan view of the die included in the first drawing device, Figure 26 is a section on line 26—26 of Figure 25, Figure 27 is a plan view of the metal strip, showing a succession of drawing operations, Figure 28 is a vertical section taken through the drawing device on line 28—28 of Figure 27, Figure 29 is a plan view of the ribbon illustrating the punching out of the ends of the drawn eyelets, Figure 30 is a transverse vertical section taken on line 30—30 of Figure 29, Figure 31 is a plan view of the ribbon, showing the drawn eyelets in the leading position blanked from the ribbon, Figure 32 is a transverse section taken on line 32—32 of Figure 31, Figure 33 is a plan view of the ribbon, showing the same moved to the next step illustrating the operation of the centering pins, Figure 34 is a transverse section taken on line 34—34 of Figure 33, and, Figure 35 is a perspective view of the finished eyelet.

In the drawings, wherein for the purpose of illustration is shown a preferred embodiment of apparatus used in the practice of the method, Figures 1, 2, 5, and 9, the numeral 20 designates a preferably stationary bed of a power press, having a coacting ram 21, which is moved toward and from the bed 20, as is well known. Since the power press may be of any conventional construction no further description is deemed necessary.

Mounted within the power press is a sub-press 22, Figures 6, 9, 11, 12, and 13, comprising an upper shoe 23 and a lower shoe 24. The lower shoe is stationary with respect to the bed 20 and is rigidly secured thereto by clamps 25 in turn attached to the bed 20 by screws 26. The upper shoe 23 is raised and lowered with respect to the lower shoe and must be accurately guided during this movement, and to effect this four vertical guide pillars 27 are provided, Figures 2, 3, and 4, the lower ends of which are rigidly secured to the lower shoe 24 while their upper ends have a sliding fit within sleeves or bushings 28, rigidly held within openings 29, formed in the upper shoe 23. The pillars 27 and associated elements are arranged adjacent to the corners of the upper and lower shoes, as shown.

The upper shoe 23 is provided centrally thereof with a screw-threaded opening 30, Figure 9, to receive the reduced screw-threaded extension 31 of a shank 32. This shank is clamped to the ram 21 but may be separated therefrom when desired. To accomplish this, the ram 21 is provided upon its front face with a recess 33, Figure 1, which is preferably wedge-shaped in horizontal cross-section. This recess is arranged opposite a recess 34, also preferably wedge-shaped in horizontal cross-section and formed in a clamping block 35. The assembled recesses 33 and 34 receive therein the shank 32, which is clamped therein. Screws 36 pass through openings formed in the block 35 and engage within screw-threaded openings 37 in the ram, Figure 9. The top of the block 35 terminates substantially at the same elevation as the top of the shank. The shank 32 is tubular, Figure 9, affording a chamber 38, for receiving a heavy compressible coil spring 39, engaged at its upper end by a plug 40, having screw-threaded engagement within the shank 32, as shown. By turning the plug 40 the tension of the spring 39 may be adjusted. Arranged within the bottom of the tubular shank 32 is a plunger 41, disposed beneath the spring 39, and urged downwardly by the same. The plunger 41 has a reduced plunger extension 42 mounted to reciprocate within a vertical opening 43, and projecting downwardly into a recess 44, formed upon the lower face of the upper shoe 23, and centrally thereof.

The numeral 45 designates a sub-sub-press, arranged near the intake end of the machine, Figures 2, 3, 6, 9, 10, 11, 12, and 13. This sub-sub-press comprises a lower shoe 46, arranged upon the shoe 24, and rigidly clamped to the same by means of screws 47, passing downwardly through the upper surface of the shoe 46. The sub-sub-press 45 further comprises an upper shoe 48, rigidly secured to the shoe 23 by screws 49, passing downwardly through the upper surface of the shoe 23. The lower shoe 46 is relatively stationary and means are provided to accurately guide the upper shoe 48 when it is moved toward and from the lower shoe 46. This guide means comprises vertical pillars 50, the lower ends of which are rigidly held within openings 51 formed in the shoe 46 and project slightly below the shoe 46 to enter openings 52 formed in the shoe 24. The upper ends of the pillars 50 have a sliding fit within guide sleeves or bushings 53, rigidly held within openings 54, formed in the shoe 48. The sub-sub-press 45 is removable as a unit from the sub-press, and to effect this separation the screws 47 are removed and the screws 49 are removed and the shoe 46 is lifted slightly with respect to the shoe 24 so that the lower ends of the pillars 50 are withdrawn from the openings 52. When this is done, the sub-sub-press including the connected shoes 46 and 48 may then be moved laterally from within the sub-press. This sub-sub-press carries elements which cut or punch the work and these elements must be ground or sharpened and this sub-sub-press is therefore removable as a unit to provide ready access to these parts.

The sub-sub-press 45 is provided with means to form notches or cuts 55, Figure 19, upon an elongated strip or ribbon 56, from which the eyelets or the like are to be formed. This strip 56 ordinarily has a thickness of .005 of an inch although the same may vary. The strip 56 is formed of any suitable metal which can be drawn, such as nickel, copper, steel, brass, zinc, or the like. The strip or ribbon 56 is fed longitudinally in the direction of the arrow and the notches 55 are formed in succession in transverse pairs. The means which forms the notches comprises a pair of notching punches 57, Figures 3, 11, 19, and 20, which are rigidly held within openings 58, formed in the upper shoe 48. The notching punches are tubular and have cylindrical bores 59, Figure 20. The notching punches 57 have a straight cutting edge 60 and generally semi-cylindrical depending extensions 61, Figure 11, having inner straight vertical faces 62. The cutting edges 60 face inwardly with respect to the strip or ribbon 56 to cut the curved notches 55 therein. The notching punches 57 enter dies 63, rigidly held within the lower shoe 46, when the upper shoe 48 is moved toward the lower shoe, and the extensions 61 enter the dies 63 before the notching edge 60 engages with the strip or ribbon to notch the same. Arranged within the dies 63 are plugs 64, which are cylindrically curved, and have their inner portions cut away providing flat faces 65, which afford segmental passages 66 to receive the blanks which are stamped when the notches 55 are produced and these blanks are fed downwardly through the passages. The plugs 64 are provided with reduced cylindrical extensions 67, at their upper ends, which are concentric with the plugs 64 and have their inner faces cut away to provide flat faces 68. The flat faces 68 serve as guides for the strip or ribbon 56. The extensions 67 project above the dies 63 and enter the bores 59 of the notching punches, when these notching punches move downwardly. It is thus apparent that the faces 68 serve to properly guide or center the strip or ribbon 56 before the notching punches descend. When the notching punches are in the uppermost position they are separated from the plug extensions 67.

The sub-sub-press 45 also has means, Figures 3, 12, 21, and 22, for forming pairs of circularly curved concentric slits 69, 70, and 71 in the strip or ribbon 56 and this means is arranged in advance of the notch producing devices. The slits 69 may be regarded as formed upon opposite sides of a diagonal line 72 and the slits 70 upon the opposite sides of a diagonal line 73 and the lines 72 and 73 are parallel. These slits form webs 74, between their ends whereby the material of the strip within the slits remains attached to the strip. The slits 71 are arranged upon the opposite sides of a diagonal line 75 and the line 75 is arranged transversely of or generally at a right angle to the lines 72 and 73. The slits 71 form webs 76, between their ends and these webs retain the material within the slits attached to the strip or ribbon 56. As the triangular groups of pairs of slits are produced in succession the arrangement is produced as shown in Figure 21.

The outer webs 74 will pull material from the notches 55. The inner webs 74 will pull material from the slits 71, and the webs 76 will pull material from the inner slits 69 and 70. Particular attention is called to the fact that the thicknesses of the webs 74 between the material surrounded by the slits 69 and 70 and the edges of the notches 55 and the thicknesses of the webs 76 between the material surrounded by the slits 71 and the inner slits 70, and the thicknesses of the webs between the material surrounded by the slits 69 and the adjacent slits 71 and the thicknesses of the webs between the material surrounded by the slits 70 and the adjacent slits 71 are all substantially equal. All of these webs have substantially the same radial dimension. The notches 55 also form a triangular group with the triangular group of pairs of concentric slits, and the centers of the notches and the centers of the pairs of slits are equidistantly spaced upon the sides of the triangular group. The means for producing the pairs of slits 69, 70, and 71 in the triangular group comprises three slitting punches 77, 78, and 79, arranged in a triangular group and rigidly held in openings in the upper shoe 48. Each of these slitting punches, Figures 4, 12, 21, and 22, has a pair of diametrically oppositely arranged notches 80, and these notches produce the webs 74 and 76. The notches 80 in the slitting punches 77 and 78 are arranged at the same angle while the notches 80 of the slitting punch 79 are arranged transversely of or at generally 90° to the notches of the other two slitting punches. The slitting punch 77 enters a die 81, the slitting punch 78 enters a die 82, and the slitting punch 79 enters a die 83. These dies 81, 82, and 83 are arranged in a triangular group and are rigidly held within openings formed in the lower shoe 46. The slitting punches are tubular so that they may be beveled upon their inner sides providing sharp straight cutting edges 77', Figure 22. The notching punches 57 form a triangular group with the slitting punches 77, 78, and 79 and the centers of the notching punches and slitting punches are equidistantly spaced upon the sides of the triangular group.

The sub-sub-press 45 is provided with a triangular group of drawing devices to perform the first drawing operation, Figures 3, 13, 23, and 24. The drawing is done upwardly and the lower shoe 46 has a triangular group of openings 84 within which are rigidly held a triangular group of drawing punches 85. These drawing punches are arranged to enter a triangular group of dies 86 rigidly held in openings 87 formed in the upper shoe 48. Each die 86 for the drawing punch includes a plunger 86' to contact with the top of the eyelet being formed. The plunger 86' is prevented from dropping out by a flange 87' and it is moved downwardly by a plunger 88' moved down by a spring 89' having its tension regulated by a screw-threaded plug 90'. The function of the plunger 86' is to remove the partly drawn article from within the die 86, when the upper shoe 48 is elevated.

A stripper 88, Figures 13, 24, 25, and 26, is provided for the drawing punches 85 and the slitting dies 81, 82, and 83, and the notching punches 57. The stripper 88 has openings 89 to receive the dies 63 of the notching devices. The stripper also has openings 90 to receive the dies 81, 82, and 83 of the slitting devices. The stripper 88 has a triangular group of recesses 91 within which are mounted bushings 92, rigidly held in place therein. The upper faces of the bushings are flush with the upper face of the stripper 88. Each bushing is tubular and has a central bore 93 to receive the drawing punch 85. The bushing is cylindrical and is provided upon its upper face with an annular groove 94 and diametrically oppositely arranged notches 95. The notches 95 are so angularly arranged that they assume positions over the webs 74 and 76 so that no binding action occurs at these webs and the annular groove 94 is arranged over the slits 69, 70, and 71. The segmental faces 96 of the bushing 92 will contact with the strip 56 entirely within the slits and up to but not beyond the ends of the slits while the annular face 97 of the bushing will contact with the strip 56 in a zone outwardly of the slits. The slits and the webs are therefore left sufficiently free so that the metal may be drawn evenly in all directions during the drawing process. The upward movement of the stripper 88 is limited by stationary brackets 98, arranged at the corners thereof. The stripper is moved upwardly, Figure 5, by four plungers 99 operating within vertical openings 100 in the shoe 46, and the plungers 99 are moved upwardly by plungers 101 operating within openings 102 formed in the shoe 24. The plungers 101 are moved upwardly by plungers 103 operating within vertical openings 104 formed in the bed 20. The lower ends of the plungers 103 engage a washer 105, carried by a rod 106 screw-threaded within an opening 107 within the bed 20. The rod 106 passes through an opening 108 formed in a resilient cylinder 109, formed of rubber or the like. The lower end of the rubber cylinder 109 engages a washer 110 engaging a nut 111, screw-threaded upon the lower end of the rod 106. The washer 105 is movable longitudinally of the rod 106 and the tension of the rubber cylinder 109 may be regulated by adjusting the nut 111. The rubber cylinder 109 serves as resilient means to elevate the stripper 88, and the tension of this force may be adjusted by turning the nut 111, as is obvious.

The numeral 112 designates a stripping plate arranged adjacent to the upper shoe 48. This stripping plate has openings 113 to receive the notching punches 57. It also has a triangular group of openings 114 to receive the slitting punches 77, 78, and 79. It further has a triangular group of openings 115 to receive the dies 86 for the drawing punches 85, Figures 3, 11, 12, 13. The downward movement of the stripper 112 is limited by stationary brackets 116, rigidly secured to the upper shoe 48. The stripper 112 is moved downwardly by reciprocatory plungers 117, Figure 5, in turn moved downwardly by reciprocatory plungers 118 forced downwardly by compressible coil springs 119 having their tension regulated by screw-threaded plugs 120.

Arranged in advance of the sub-sub-press 45 is a sub-sub-press 121, Figures 2, 7, 9, 10, 27, and 29, comprising a lower shoe 122, which may be permanently rigidly secured to the shoe 24 by screws or the like. The shoe 122 is provided with triangular groups of vertical openings 123 receiving and rigidly holding triangular groups of drawing punches 124, facing upwardly, as shown. Arranged adjacent to the drawing punches 124 is a stripper 125, having triangular groups of vertical openings 126 to receive the drawing punches. As stated, the punches 124 are arranged in triangular groups, and the punches in each group have the same diameter and the same height, but the punches in the succeeding triangular groups decrease in diameter and increase in vertical dimension, and the openings 126 decrease in diameter accordingly, Figure 29. When the stripper 125 is in the lowermost position, all punches 124 project above the same. The upward movement of the stripper 125 is limited by stationary brackets 127, secured to the shoe 122. The stripper 125, Figure 6, is raised by vertical reciprocatory plungers 128 operating within openings formed in the shoe 122. The plungers 128 are raised by plungers 129 operating within openings formed in the shoe 24. The plungers 129 are raised by vertical reciprocatory plungers 130 operating within vertical openings formed in the bed 20. The plungers 130 engage a washer 131 carried by a vertical rod 132 which is rigidly secured to the bed 20. The rod 132 carries a resilient rubber cylinder 133 and a lower washer 134 engaged by a nut 135, having screw-threaded engagement with the lower end of the rod 132. Arranged upon opposite sides of the shoe 122, Figure 7, and beneath the stripper 125 are levers 136, pivotally connected at 137 with knuckles 138, carried by blocks 139, rigidly attached to the shoe 24 by any suitable means. The levers 136 are moved upwardly by vertical reciprocatory plungers 140, in turn moved upwardly by vertical reciprocatory plungers 141. These plungers 141 are moved upwardly by vertical reciprocatory plungers 142. Each plunger 142 has its lower end contacting with a plunger 143 integral with a washer 144 and this washer carries a depending tube 145 integral therewith. The numeral 146 designates a rigid strap having a vertical rod 147 rigidly attached thereto at its center and this rod has a reduced extension 148 rigidly attached thereto which is slidable within the bore of the tube 145. A resilient rubber cylinder 149 is carried by the tube 145 and rod 147 and is arranged between the washer 144 and the strap 146. The strap is provided at its opposite ends with openings 150, slidably receiving vertical rods 151, having screw-threaded ends, receiving nuts 152. The upper ends of the rods 151 are screw-threaded within openings 153 formed in the bed 20. By adjusting the nuts 152 the tension of the rubber cylinder 149 is regulated, as is obvious. It is thus seen that the two rubber cylinders 149 yieldingly press the levers 136 upwardly which in turn act upon the stripper 125 to raise it. The stripper 125 is therefore raised by the combined action of the rubber cylinder 133 and the rubber cylinders 149.

The levers 136 are depressed by fingers 154, rigidly attached to the shoe 23. When the shoe 23 moves downwardly the fingers 154 shift the levers 136 downwardly so that the stripper 125 is relieved of the upward yielding pressure from the rubber cylinders 149, before the stripper 125 is moved downwardly, thus reducing the upward yielding pressure on this stripper.

The sub-sub-press 121, Figures 4, 7, 9, and 28, comprises an upper shoe 155 which is permanently and rigidly secured to the shoe 23 by screws or the like. Arranged upon the lower face of the shoe 155 is an attaching plate 156, having openings 157. These openings are circular in cross-section and tapered and decrease in diameter downwardly. The attaching plate 156 is rigidly secured to the shoe 155 by screws or the like. Rigidly held within the openings 157 are dies 158, correspondingly tapered. These dies are formed of very hard metal. The dies 158 are arranged in triangular groups, corresponding to the group arrangement of the drawing punches 124 and the openings of the dies are of suitable diameters to properly receive the drawing punches so that they will perform a drawing operation. The diameter of the openings of the dies in each triangular group are therefore the same but the diameters in the succeeding groups decrease, as described in connection with the drawing punches.

The numeral 159 designates reciprocatory ejectors, corresponding in number and arrangement to the dies 157, and operating within the same. The ejectors are of course arranged in triangular groups and the diameters of the ejectors in each group are the same, but the diameters of the ejectors in succeeding groups decrease in a forward direction, as explained in connection with the drawing punches 124. All of the ejectors are moved downwardly by a common plunger 160, urged downwardly by the plunger 42.

The numeral 161 designates a sub-sub-press, Figures 2, 3, 4, 9, 10, 15, 16, 17, 18, and 30, including upper and lower shoes 162 and 163 which are detachably mounted upon the shoes 23 and 24 respectively in a manner similar to the mounting of the shoes 48 and 45 and it is therefore thought to be unnecessary to again describe this mounting. The sub-sub-press 161 may be removed from between the shoes 23 and 24 by a lateral movement as explained in connection with the sub-sub-press 45. The shoe 163 has a triangular group of vertical openings 164, rigidly holding upwardly facing end-piercing punches 165, Figure 30, arranged in a triangular group. The shoe 163, Figure 17, also has a triangular group of vertical openings 166, rigidly holding dies 167 of blanking or separating devices. The dies 167 are tubular and their bores register with vertical openings 168 at the bottom so that the completed eyelets blanked or separated from the strip pass downwardly from the dies 167 and through the openings 168.

Arranged above the shoe 163 is a stripper 169, having vertical openings 170 to receive the end-piercing punches 165 and vertical openings 171 to receive the dies 167. The upward movement of the stripper 169 is limited by stationary brackets 172, secured to the shoe 163. The stripper 169 is raised by plungers 173, Figures 2, 3, 9. The plungers 173 operate within vertical openings 174 formed in the shoe 163 and are moved upwardly by plungers 175 operating within vertical openings 176 in the shoe 24. The plungers 175 are moved upwardly by plungers 177 operating within vertical openings 178 formed in the bed 20. The dies 167 are arranged between the plungers 175, as shown.

Arranged above and spaced from the stripper 169 is a bridge 179, having a triangular group of openings 180. This bridge is rigidly secured to the stripper 169 by screws 181 and the bridge is held spaced from the stripper by blocks 182. The triangular group of openings 180 are in alignment with a triangular group of openings 183 formed in the stripper 169, and the triangular group of openings 183 are in alignment with a triangular group of openings 184, formed in the shoe 163.

The upper shoe 162, Figures 4, 9, 17, 16, and 30, of the sub-sub-press 161 is provided with vertical openings 183, rigidly holding dies 186, to receive the end-piercing punch 165. The bores of the die 186 are in registration with a vertical opening 187, formed in the shoe 23 and passing to the upper surface thereof. When the punch 165 pierces the hole in the end of the eyelet being formed, a small blank is stamped out and these blanks work upwardly through the opening 187 and discharge therefrom.

The shoe 162, Figure 17, is provided with a triangular group of vertical openings 188, receiving a triangular group of blanking or separating punches 189, arranged to enter the dies 167. These punches blank or separate the completed eyelet from the strip or ribbon and force the same into the bores of the dies 167 and they are fed through the openings 168. Since the punches 189 blank or cut and do not draw, there is little, if any, tendency for the separated completed eyelets to stick to the punches 189. However, we provide an ejector 190 in connection with each punch 189 and this ejector operates within an opening 191 in the punch. The ejector extends above the shoe 123 and when the shoe is moved to the elevated position the ejector contacts with a stationary trip 192 and is moved downwardly with relation to its punch and should an eyelet stick to the punch it will eject the eyelet from the punch. This eyelet would fall upon the stripper 169 and be blown therefrom by air pressure which is constantly directed upon the stripper for this purpose. The shoe 162 also has vertical openings for receiving vertical guide pins 193 which are rigidly held therein and project below the shoe 162. These guide pins are arranged in a triangular group and will enter the aligned openings 180, 183, and 184 and the openings formed in the strip or ribbon 56 after the eyelets are blanked or separated therefrom. These pins thus serve to guide or center the strip or ribbon to prevent displacement of the same.

The numeral 194 designates an upper stripper, Figures 4, 9, 16, 17, and 30, having a triangular group of openings 195 to receive the blanking or separating punches 189. The stripper 194 also has a triangular group of openings 196 to receive the dies 185. The stripper 194 has an opening 179' to receive the bridge 179. The numeral 197 designates a centering or guiding plate, having a triangular group of openings 198 to receive the partly formed eyelets, and accurately center them with relation to the end-piercing punches 165 and the dies 185. The plate 197 is rigidly secured to the stripper 194. The punches 165 enter the openings of the dies 185 and the dies 185 move down to substantial contacting relation with the centering plate 197. The upper ends of the eyelets may extend above the centering plate for a slight distance so that they will contact with the dies 185. Arranged upon opposite sides of the triangular group of punches 165 are stripping plates 199, fixedly secured to the lower stripper 169. These stripping plates have recesses 200 for receiving the edges of the strip or ribbon outwardly of the partly formed eyelets. Should there be any tendency for the eyelets to stick within the openings 198 when the stripper 194 is raised, these eyelets will be moved out of the openings by the action of the strip or ribbon engaging beneath the stripping plates 199. The centering plate 197 is arranged within a recess 201 and is secured to the stripper 194 by screws or the like and the stripping plates 199 also pass into this recess 201.

We provide dead openings 202 to receive the eyelets, so that they will not be squashed.

The downward movement of the stripper 194 is limited by stationary brackets 203 which are secured to the shoe 162. The stripper 194 is moved downwardly by plungers 204, moved downwardly by plungers 205, forced downwardly by springs 206.

The strip or ribbon is fed intermittently or step by step through the machine, from right to left and this intermittent feeding movement may be effected by rollers 207. The strip or ribbon must be moved each step, a distance corresponding to the distances between the centers of the eyelets being formed in one triangular group and the centers of the eyelets being formed in the next leading triangular group. This will cause all of the devices to properly function.

The operation of the machine in the practice of the method is as follows:

The leading end of the strip or ribbon 56 is presented to the right or intake end of the machine, Figures 9 and 10, and the ribbon is fed longitudinally in a step-by-step manner. The shoe 23 is moved downwardly to effect the various operations upon the work while the ribbon is at rest between the steps of the feed movement, after which the shoe 23 is raised and the ribbon is advanced for the next step. The reciprocation of the notching punches 57, produce in succession the transverse pairs of circularly curved notches 55, at the opposite longitudinal edges of the ribbon 56. The notches 55 have centers 55ª, Figures 19, 21, 19a, and 20a, and these centers are equidistantly spaced, and the ribbon is fed each step for a distance equal to the distance between an adjacent pair of centers 55ª. After the first pair of notches 55 has been made, the ribbon being fed one step for this purpose, the ribbon is then fed two steps and when the third pair of notches is made the first triangular group of pairs of slits 69, 70, and 71 are made, Figure 19, and triangular groups of slits are formed in succession. Figure 19a shows three successive transverse pairs of notches 55 stamped in the longitudinal edges of the ribbon and when the third pair of notches 55 was stamped the first or leading triangular group of slits was produced. Figure 20a shows the next step of the ribbon and the formation of the fourth or trailing pair of transverse notches 55. The trailing notches 55 are the notches which form with the leading triangular group of slits a larger triangular group. Along the sides of this larger triangular group the centers 55ª, 69ª, and 71ª are equidistantly spaced. It is this larger triangular arrangement which throws the notches in proper relation to the outer slits. In Figure 20a the next trailing triangular group of pairs of slits should be shown as they are stamped at the same time that the fourth or trailing pair of notches 55 are stamped but this trailing triangular group of slits has been omitted from Figure 20a for the purpose of illustration but is clearly shown in Figure 21. Since the dies which stamp the triangular group of curved slits are arranged in a triangular group the triangular group arrangement of the slits has been explained. However, when a number of the triangular groups of slits have been stamped then longitudinal rows of the pairs of slits are produced and also longitudinal rows of notches. In Figures 21 and 23 three rows of slits are produced. There are two outer rows which are arranged inwardly of and adjacent to the rows of notches and an inner row which is disposed between the outer rows. The webs between the ends of the slits in the two outer rows are inclined transversely of the strip so that the outer webs are arranged adjacent to and opposite the notches 55 and to one side of the center of these notches. The inner row of slits have their webs transversely inclined with respect to the ribbon but in an opposite direction to the inclination of the webs in the outer rows of slits. This brings the webs of the inner row of slits adjacent to and opposite the inner slits of the outer rows of pairs of slits, and this also brings the inner webs of the outer rows of slits adjacent to and opposite the slits of the inner row. Furthermore, the pairs of slits in the outer rows are staggered with respect to the notches and the outer webs of the outer rows of slits are brought adjacent to and opposite the notches. The arrangement of the pairs of slits in the outer rows provide outwardly flaring portions between the pairs of slits at the longitudinal edges of the strip and the notches are formed in these outwardly flaring portions. The pairs of slits are circularly curved, concentric and have centers 69a, 70a, and 71a. The center 71a of the pair of slits at the apex of the triangular group is in the leading position and at the central longitudinal axis of the strip or ribbon 56. Starting from any pair of notches 55, as 1, and counting to the third pair of notches 55 forwardly, it will then be seen that the centers 55a of the third pair of notches are in transverse alignment with the center 71a. The triangular groups of pairs of slits overlap, and the centers 71a of the pairs of slits 71 are spaced for a distance equal to the distance between the pairs of centers 55a of the notches. The centers 55a, 69a, 71a, and 70a are all equidistantly spaced, longitudinally and transversely of the ribbon 56. It is thus apparent that before the drawing operation is started, a stamped blank is provided having the circularly curved notches at its edges and the pairs of circularly curved concentric slits arranged in triangular groups, which overlap, and disposed in a definite relation with respect to the pairs of notches. As the feeding movement of the ribbon continues, each triangular group of pairs of slits reaches the first drawing punches 85 and these drawing punches and their coacting dies produce the partly drawn upstanding eyelets then having the maximum diameter and the minimum height. Upon the succeeding step or steps in the feeding of the ribbon, these upstanding partly drawn eyelets enter the dead openings and then pass over the first group of drawing punches 124 and when the shoe 156 again descends this set of drawing punches coacts with the dies 157, to further draw the eyelets, decreasing their diameter and increasing their height. When the shoe 156 rises, the ejectors 159 force the eyelets from the dies 157 and the stripper 125 frees them from the punches 124. Each triangular group of eyelets is acted upon in succession by the triangular groups of punches 124, while the ribbon is fed through the sub-press 121. By the time the leading group of eyelets reach the leading group of drawing punches 124 and are acted upon thereby, the eyelets in the leading group will have the minimum diameter and the maximum height. The next step or steps of the strip brings the leading group of eyelets into the dead openings 202 at the rear of the end-piercing punches 165, and the next step of the strip or ribbon brings this leading group of eyelets over the end-piercing punches 165, and when the shoe 162 again descends, the punches 165 punch holes in the closed ends of the eyelets and the blanks thus produced pass through the openings 181. The leading group of eyelets with the ends punched out now move for step or steps into the dead openings 202 and the next step brings them beneath the blanking or separating punches 189. When the punches 189 descend, the shank of the eyelets enter the openings in the punches 189 while the punches enter the openings of the dies 167 and blank or cut the flanges of the eyelets from the strip or ribbon and these eyelets are introduced into the openings of the dies 167 and their flanges engage therewith. As the punches 189 rise, the eyelets ordinarily move out of the openings of the punches 189 by virtue of the frictional engagement between the flanges of the eyelets and the dies 167 and feed downwardly through the openings of the dies. However, should a separated eyelet occasionally remain within the opening of one of the punches 189, it is forced therefrom by the ejector 190, which is a slight ejector and moved downwardly as the shoe 23 rises, since the ejector engages the stationary trip 192.

During the drawing operation of the eyelets by the drawing punches 124, the eyelets and strip or ribbon rest upon the stripper 125, and as the drawing dies descend, the fingers 154 depress the levers 136 before the drawing dies receive or engage the eyelets, thus reducing the upward yielding action or tension upon the stripper 125. The single rubber cylinder 132 will now exert the proper yielding pressure upon the stripper. If too much yielding pressure were exerted upon the stripper, there would be a tendency for the partly formed eyelets to be squashed before they could be further drawn. However, an increased yielding pressure is desired to return the stripper 125 to the raised position to withdraw the eyelets from the several stripping punches, and as the fingers 154 rise, they disengage levers 136, and the combined action or tension of the three rubber cylinders is transmitted to the stripper, to produce an increased yielding upward force applied thereto.

It is to be understood that the form of the machine herewith shown and described is to be taken as a preferred example of the same, and that various changes in the shape, size, and arrangement of parts may be resorted to without departing from the spirit of our invention or the scope of the subjoined claims, and that various changes in the order of the steps of the method may be resorted to, and various changes may be made in the arrangement of parts of the formed blank, without departing from the spirit of the invention or the scope of the subjoined claims.

Having thus described our invention, what we claim is:

1. In the method of forming eyelets from a strip which can be drawn, the steps of effecting a step-by-step longitudinal feeding movement of the strip, forming sets of pairs of opposed slits in the strip between its longitudinal edges while the strip is at rest between its step movements, subjecting the portions of the strip between the pairs of opposed slits to a drawing action while subjecting the strip to a pressure in opposition to the pressure of the drawing action to produce the eyelets, and increasing said pressure in opposition to the drawing action pressure to free the drawn eyelets and strip.

2. In the method of forming eyelets from a strip which can be drawn, the steps of forming longitudinally of the strips sets of opposed pairs of slits, simultaneously subjecting the portions of the strip between the pairs of opposed slits of a plurality of sets of slits to a drawing action while subjecting the strip to pressure in opposition to the pressure of the drawing action to produce the eyelets, and then increasing said pressure in opposition to the drawing action pressure to free the drawn eyelets and strip.

3. In the method of forming eyelets from a strip which can be drawn, the steps of forming a pair of opposed curved slits in the strip having their ends spaced to provide webs, subjecting the portion of the strip between the curved slits to a drawing action while subjecting the strip inwardly of the curved slits to a yielding pressure in opposition to the pressure of the drawing action and while maintaining the webs between the slits free from the pressure in opposition to the pressure of the drawing action.

4. In the method of forming eyelets from a strip which can be drawn, the steps of forming a pair of opposed curved slits in the strip having their ends spaced to provide webs, subjecting the portion of the strip between the curved slits to a drawing action while subjecting the strip inwardly of the curved slits to a yielding pressure in opposition to the pressure of the drawing action while maintaining the strip at the slits and the webs between the slits free from pressure in opposition to the pressure of the drawing action.

5. In the method of forming eyelets from a strip which can be drawn, the steps of forming a longitudinal group of spaced pairs of curved slits in the strip near and spaced from the longitudinal edge of the strip, the curved slits in each pair being oppositely arranged and substantially concentric and being of substantially the same length and having radii of substantially the same length, the ends of the curved slits in each pair being spaced to provide substantially diametrically oppositely aligned webs, such aligning diameter being disposed diagonally with relation to the longitudinal edge of the strip, the adjacent slits in different pairs providing outwardly flaring spaces between the pairs of slits leading to the longitudinal edge of the strip, the webs between the ends of the pairs of slits next to the longitudinal edge of the strip being arranged upon the sides of said outwardly flaring spaces, forming notches in the outwardly flaring spaces and longitudinal edge of the strip and arranging the notches in staggered relation to the pairs of slits and adjacent to and extending across the webs at the sides of said spaces, and forming an opening in the strip adjacent to and extending across the web between the opposite ends of each pair of curved slits.

6. In the method of forming eyelets from a strip which can be drawn, the steps of forming a longitudinal group of pairs of curved slits in the strip and arranging the pairs of slits near and spaced from the longitudinal edge of the strip and arranging the curved slits in each pair in opposed relation and spacing the opposite ends of the slits to provide webs and arranging the webs in substantial diametrically aligned relation and arranging the aligning diameter diagonally with relation to the longitudinal edge of the strip and arranging all aligning diameters substantially parallel, the arrangement being such that adjacent slits in different pairs provide outwardly flaring spaces between the pairs of slits leading to the longitudinal edge of the strip and the webs between the ends of the pairs of slits next to the longitudinal edge of the strip being arranged upon the sides of said outwardly flaring spaces, forming notches through the outwardly flaring spaces and longitudinal edge of the strip, and forming openings in the strip adjacent to and extending across the webs between the opposite ends of the curved slits which are remote from said longitudinal edge of the strip.

7. A blank from which eyelets are to be formed, said blank comprising a metal strip, said strip having a longitudinal group of spaced pairs of curved slits which are spaced from the longitudinal edge of the strip, the curved slits in each pair being oppositely arranged, the ends of the curved slits in each pair being spaced to provide substantially diametrically oppositely aligned webs, such aligning diameters of the different pairs of slits being disposed diagonally with relation to the longitudinal edge of the strip and substantially parallel with relation to each other, the adjacent slits of different pairs forming outwardly flaring spaces between the pairs of slits leading to the longitudinal edge of the strip, said outwardly flaring spaces being provided with outwardly flaring notches passing through the longitudinal edge of the strip, said strip having openings arranged adjacent to and extending across the webs at the ends of the slits remote from the longitudinal edge.

8. The method of forming eyelets upon an elongated strip which can be drawn, comprising the steps of forming upon the strip a longitudinal row of spaced pairs of curved slits and arranging the slits in each pair substantially concentric and spacing their ends to provide opposed webs, inclining the opposed webs of each pair of slits in the row transversely with respect to the strip, forming upon the strip upon one side of the first named longitudinal row a second longitudinal row of spaced pairs of curved slits and arranging the slits in each pair substantially concentric and spacing their ends to provide opposed webs, inclining the opposed webs of each pair of slits in the second row transversely of the strip and in an opposite direction to the inclination of the opposed webs in the first named row and thereby bringing the webs of said second named row adjacent to and opposite the slits in said first named row and the webs of said first named row adjacent to and opposite the slits in said second named row.

9. The method of forming eyelets from an elongated strip which can be drawn, comprising the steps of forming upon the strip longitudinal rows of spaced pairs of curved slits and arranging the slits in each pair substantially concentric and spacing their ends to provide opposed webs, inclining the opposed webs of each pair of slits in the rows transversely in the same direction with respect to the strip, forming upon the strip between the first named rows of pairs of slits an inner longitudinal row of spaced pairs of curved slits and arranging the slits in each pair substantially concentric and spacing their inner ends to provide opposed webs, inclining the opposed webs of each pair of slits in the inner row transversely of the strip and in an opposite direction to the inclination of the opposed webs in the first named rows of slits and thereby bringing the opposed webs of the pairs of slits in the inner row adjacent to and opposite the inner slits in the pairs of slits in the first named rows and the slits in the pairs of slits in the inner row adjacent to and opposite the inner webs of the pairs of slits in the first named rows.

10. The method of forming eyelets from an elongated strip which can be drawn, comprising the steps of forming upon the strip longitudinal rows of spaced pairs of curved slits and arranging the slits in each pair substantially concentric and spacing their ends to provide opposed webs, arranging the centers of the pairs of curved slits in one row in transverse alignment with the centers of the pairs of curved slits in the other longitudinal row, arranging the opposed webs of each pair of slits in a transversely inclined position with respect to the strip, forming upon the strip between the first named rows of pairs of slits an inner longitudinal row of spaced pairs of curved slits and arranging the slits in each pair substantially concentric and spacing their inner ends to provide opposed webs, arranging the centers of the pairs of slits in the inner row in staggered relation to the centers of the pairs of slits in the first named rows, inclining the opposed webs of each pair of slits in the inner row transversely of the strip and in an opposite direction to the inclination of the opposed webs in the first named rows of slits and thereby bringing the opposed webs of the pairs of slits in the inner row adjacent to and opposite the inner slits in the pairs of slits in the first named rows and the slits in the pairs of slits in the inner row adjacent to and opposite the inner webs of the pairs of slits in the first named rows.

11. The method of forming eyelets from an elongated strip which can be drawn, comprising forming longitudinal rows of spaced curved notches upon the longitudinal edges of the elongated strip, forming upon the strip outer longitudinal rows of spaced pairs of curved slits and arranging the slits in each pair substantially concentric and spacing their ends to provide opposed webs, arranging the pairs of slits in the rows in staggered relation to the notches, arranging the opposed webs of each pair of slits in a transversely inclined position with respect to the strip so that the outer webs of the slits in one longitudinal row are arranged adjacent to and opposite the notches in one row and to one side of the centers of said notches, and forming upon the strip between the outer rows of pairs of slits an inner longitudinal row of spaced pairs of curved slits and arranging the slits in each pair substantially concentric and spacing their ends to provide opposed webs, inclining the opposed webs of each pair of slits in the inner row transversely of the strip and in an opposite direction to the inclination of the opposed webs in the outer rows of slits and thereby bringing the opposed webs of the pairs of slits in the inner row adjacent to and opposite the inner slits in the pairs of slits in the outer rows and the slits in the pairs of slits in the inner row adjacent to and opposite the inner webs of the pairs of slits in the outer rows.

12. The method of forming eyelets from an elongated strip which can be drawn, comprising forming longitudinal rows of spaced curved notches upon the longitudinal edges of the elongated strip, forming upon the strip longitudinal rows of spaced pairs of curved slits and arranging the slits in each pair substantially concentric and spacing their ends to provide opposed webs, arranging the pairs of slits in the rows in staggered relation to the notches, arranging the opposed webs of each pair of slits in a transversely inclined position with respect to the strip so that the outer webs of the pairs of slits in one longitudinal row are arranged adjacent to and opposite the notches in one row and forming openings adjacent to and opposite the inner webs of each row of spaced pairs of slits.

13. The method of forming eyelets from an elongated strip which can be drawn, comprising the steps of forming upon the strip a pair of curved slits and arranging the slits in the pair substantially concentric and spacing their ends to provide opposed webs, forming upon the strip a second pair of spaced curved slits and arranging the slits in such second pair substantially concentric and spacing their ends to provide opposed webs, and arranging the web of one pair of slits adjacent to and opposite one slit in the other pair of slits.

14. The method of forming eyelets from an elongated strip which can be drawn, comprising the steps of forming upon the strip a longitudinal row of spaced pairs of curved slits and arranging the slits in each pair substantially concentric and spacing their ends to provide opposed webs, forming upon the strip upon one side of the first named longitudinal row a second longitudinal row of spaced pairs of curved slits and arranging the slits in each pair substantially concentric and spacing their ends to provide opposed webs, and bringing the webs of the second named row next to and opposite the sides of the slits in the first named row and the webs of the first named row next to and opposite the sides of the slits in said second named row.

15. The method of forming eyelets from an elongated strip which can be drawn, comprising forming pairs of transversely aligned spaced notches in succession upon the longitudinal edges of the strip to produce longitudinal rows of notches, forming in succession upon the strip between the longitudinal rows of notches triangular groups of spaced pairs of curved slits and arranging the slits in each pair substantially concentric and spacing their ends to provide opposed webs and thereby providing longitudinal rows of spaced pairs of curved slits, arranging the webs of the rows of slits next to the rows of notches next to and opposite the sides of the notches and arranging the webs of each longitudinal row of slits next to and opposite the sides of the slits in the next longitudinal row of slits.

16. The method of forming eyelets from an elongated strip which can be drawn, comprising the steps of forming in succession a triangular group of spaced pairs of slits and arranging the slits in each pair substantially concentric and spacing their ends to provide webs and thereby forming longitudinal rows of spaced pairs of curved slits, and bringing the webs of each row next to and opposite the sides of the slits in the next row.

17. A blank from which eyelets are to be formed, said blank comprising an elongated metal strip which can be drawn, said blank having longitudinal rows of spaced pairs of curved slits, the slits in each pair being substantially concentric and having their ends spaced to provide webs, the webs in each row being arranged next to and opposite the sides of the slits in the next longitudinal row.

18. A blank from which eyelets are to be formed, said blank comprising an elongated metal strip which can be drawn, said blank having longitudinal rows of spaced pairs of curved slits, the slits in each pair being substantially concentric and having their ends spaced to provide opposed webs, the pairs of slits in one row being inclined transversely of the strip in one direction and the pairs of slits in the other row being inclined transversely of the strip in an opposite direction, the webs in each row being arranged next to and opposite the sides of the slits in the next row.

JOHN W. EKSTEDT.
KENNETH W. EKSTEDT.